US009135561B2

(12) United States Patent
Vadlamani et al.

(10) Patent No.: US 9,135,561 B2
(45) Date of Patent: Sep. 15, 2015

(54) INFERRING PROCEDURAL KNOWLEDGE FROM DATA SOURCES

(75) Inventors: Viswanath Vadlamani, Sammamish, WA (US); Arungunram Surendran, Sammamish, WA (US); Prasanth Pulavarthi, Redmond, WA (US); Phani Vaddadi, Issaquah, WA (US); Munirathnam Srikanth, Redmond, WA (US); Tarek Najm, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 13/291,126

(22) Filed: Nov. 8, 2011

(65) Prior Publication Data

US 2013/0117204 A1 May 9, 2013

(51) Int. Cl.

*G06F 15/18* (2006.01)
*G06N 5/04* (2006.01)
*G06N 5/02* (2006.01)
*G06N 99/00* (2010.01)

(52) U.S. Cl.

CPC *G06N 5/022* (2013.01); *G06N 5/04* (2013.01); *G06N 99/005* (2013.01)

(58) Field of Classification Search

CPC ....... G06N 5/04; G06N 5/022; G06N 99/005; G06F 15/18
USPC ...................................................... 706/12, 54
See application file for complete search history.

(56) References Cited

U.S. PATENT DOCUMENTS

| | | | | |
|---|---|---|---|---|
| 7,747,601 | B2 | 6/2010 | Cooper et al. | |
| 2006/0053174 | A1 | 3/2006 | Gardner et al. | |
| 2008/0104037 | A1* | 5/2008 | Bierner | 707/3 |
| 2009/0024718 | A1* | 1/2009 | Anagnostopoulos et al. | 709/218 |
| 2010/0205180 | A1* | 8/2010 | Cooper et al. | 707/740 |
| 2011/0131093 | A1* | 6/2011 | Behroozi et al. | 705/14.52 |
| 2012/0023393 | A1* | 1/2012 | Tomasic et al. | 715/224 |
| 2012/0197732 | A1* | 8/2012 | Shen et al. | 705/14.66 |

OTHER PUBLICATIONS

Tran V., et al., "OWL-T: An Ontology-based Task Template Language for Modeling Business Processes", Fifth International Conference on Software Engineering Research, Management and Applications, 2007, pp. 101-108.*

(Continued)

*Primary Examiner* — Jeffrey A Gaffin
*Assistant Examiner* — Dave Misir
(74) *Attorney, Agent, or Firm* — Dave Ream; Danielle Holmes; Micky Minhas

(57) ABSTRACT

A procedural inference system is described herein that infers procedural knowledge from various data sources to help a user complete one or more tasks for which the data sources provide information. The system understands users' queries, identifies a task at hand, provides recommendations on the steps to take and the agents to use based on a knowledge base of tasks and agents, and provides the fabric to determine which different agents can work together to help the user accomplish a task. Tasks can be started on one device and completed on another seamlessly. Users are able to finish complex, multi-step tasks efficiently, without trial and error or data reentry. Thus, the procedural inference system provides a generalized framework that helps users to complete tasks using already available data and does not ask each data provider to invest in infrastructure to build dedicated task information systems.

20 Claims, 4 Drawing Sheets

(56) References Cited

OTHER PUBLICATIONS

Albreshne A., et al., “Semantic-Based Semi-Automatic Web Service Composition”, 2010.*

Diemert E., et al., “Unsupervised Query Categorization using Automatically-Built Concept Graphs”, WWW 2009, Apr. 20-24, 2009, Madrid, Spain, pp. 461-470.*

Yoon S., et al., “Detecting Intent of Web Queries using Questions and Answers in CQA Corpus”, 2011 IEEE/WIC/ACM International Conferences on Web Intelligence and Intelligent Agent Technology, Aug. 2011, pp. 352-355.*

Jin, et al., “Task-Oriented Web User Modeling for Recommendation”, Retrieved at <<http://www.http://www.inf.unibz.it/~ricci/ATIS/papers/me-um05.pdf>>, User Modeling 2005, pp. 109-118.

Winckler, et al., “Towards a User-Centered Design of Web Applications based on a Task Model”, Retrieved at <<http://sunsite.informatik.rwth-aachen.de/Publications/CEUR-WS/Vol-153/paper3.pdf>>, In Proceedings of 5th International Workshop on Web-Oriented Software Technologies (IWWOST’2005), pp. 8.

Tran, et al., “OWL-T: A Task Ontology Language for Automatic Service Composition”, Retrieved at <<http://ieeexplore.ieee.org/stamp/stamp.jsp?tp=&arnumber=4279729>>, IEEE International Conference on Web Services, Jul. 9-13, 2007, pp. 1164-1167.

Yoon, et al., “Intent-Based Categorization of Search Results Using Questions from Web Q&A Corpus”, Retrieved at <<http://www.dl.kuis.kyoto-u.ac.jp/~yoon/58020145.pdf>>, Proceedings of the 10th International Conference on Web Information Systems Engineering, 2009, pp. 145-158.

Ullegaddi, et al., “A Simple Unsupervised Query Categorizer for Web Search Engines”, Retrieved at <<http://ltrc.iiit.ac.in/icon_archives/ICON2010/9Dec2010/Paper4-File17-Paper222.pdf>>, 8th International Conference on Natural Language Processing, Dec. 9, 2010, pp. 10.

Fomenko, Vladimir, “Generating Virtual Reality Shops for E-Commerce”, Retrieved at <<http://wise.vub.ac.be/Downloads/Theses/FomenkoV-thesis.pdf>>, May 2006, pp. 82.

* cited by examiner

INFERRING PROCEDURAL KNOWLEDGE FROM DATA SOURCES

BACKGROUND

The Internet, private networks, and other data sources are filled with vast amounts of information related to a variety of topics. Web sources may include a variety of unstructured, semi-structured, and structured information. Some text, video, and other data can be qualified as unstructured data, or data that is not organized in a manner that is actionable. This does not mean that the data is not organized according to a format (e.g., with particular headings, textual emphasis, Hypertext Markup Language (HTML) and so forth), but rather that the data is not in a form that can be readily consumed for automated processing. Most data contains at least some structure, and may include video and other multimedia sources in addition to text. Some sites contain semi-structured data, such as Wikipedia, which provides a common set of headings and a well-known format. Other sources, like WikiHow, provide information structured in numbered steps. Search engines and other software tools have been designed to crawl various available data sources and perform various techniques (e.g., document analysis, metadata extraction, keyword analysis, and so on) to determine what information a particular document or other data source contains.

One common reason that a user accesses one or more data sources is to complete a task. A task can include any action or sequence of actions that involves one or more steps; each step may have sub-steps and may involve synthesizing various sources to gather enough information or make a decision. A user's task could be any number of activities, including rolling over a 401(k) account, filling out a tax return, planning a party, buying a car, checking whether a package has been delivered, or any other activity. Today, users have to sift through thousands of agents to find one or more agents that allow them to complete a task. Agents can be device-specific programs, websites, or other data sources and applications. In a typical scenario a user might start by searching the Internet using a search engine to find help with what the user is trying to do (e.g., by submitting a query such as "rolling over a 401k"). The user then often sifts through multiple documents to find the information the user is looking for. Along the way, the user might install one or more applications or use one or more web-based tools that help the user complete all or part of the task.

Today there is no automated way for a user to consistently find information to step through and complete tasks. Each time the user wants to do something, the user starts with a blank slate and simply tries to find information to fill in the user's knowledge and to make progress in completing the task. Understanding procedural steps from a document or a set of documents is a complex issue. This is more so the case when the information is coming from multiple sources of unstructured or semi-structured data. Data might be found in any format, at any location, and the user is left to manually figure out the information, determine whether the information is helpful to the user's current intent, and carry out any steps provided by the information. Even if the user discovers an agent that will walk the user through a particular part of the process, the users particular task may involve multiple agents none of which is designed to communicate or to transfer data easily from one step of the process to another.

SUMMARY

A procedural inference system is described herein that infers procedural knowledge from various data sources to help a user complete one or more tasks for which the data sources provide information. The system understands users' queries, identifies a task at hand, provides recommendations on the steps to take and the agents to use based on a knowledge base of tasks and agents, and provides the fabric to determine which different agents can work together to help the user accomplish a task. Tasks can be started on one device and completed on another seamlessly. Users are able to finish complex, multi-step tasks efficiently, without trial and error or data reentry. The system is able to infer the user's current position within an ordered sequence of steps within a task as well as within a chained sequence of tasks related to a larger goal. With this knowledge available, the system can help the user achieve the goal, provide relevant advertising information, and so on. Thus, the procedural inference system provides a generalized framework that helps users to complete tasks using already available data and does not ask each data provider to invest in infrastructure to build dedicated task information systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
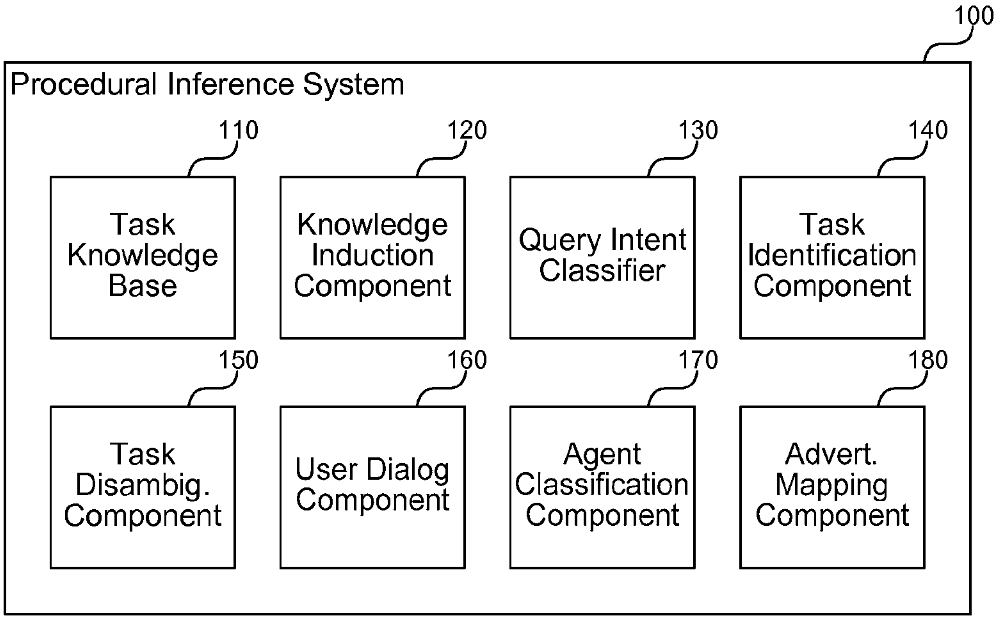
FIG. 1 is a block diagram the rates components of the procedural inference system, in one embodiment.

A procedural inference system is described herein that infers procedural knowledge from various data sources to help a user complete one or more tasks for which the data sources provide information. The system understands users' queries, identifies a task at hand, provides recommendations on the steps to take and the agents to use based on a knowledge base of tasks and agents, and provides the fabric to determine which different agents can work together to help the user accomplish a task. Tasks can be started on one device and completed on another seamlessly. Users are able to finish complex, multi-step tasks efficiently, without trial and error or data reentry. The system provides information gathering and decision making that can be used to assist users to complete tasks. In some cases, the user may still have to do extra actions (like filling out a form and sending it by mail) to complete the task, but the system provides knowledge to help the user's progress.

In some embodiments, the system aims to break up the set of information into a <Subject> <object> <predicate> <context> quadruple. The subject is who is performing the action. The object is what the action is being performed on. The predicate is what type of action is being performed. The context includes other information related to the task or portion of the task. For example, for the task of moving money into a new bank account, the subject might be the money, the object is the new bank account, the predicate is transferring funds, and the context could contain additional information, such as a type of account into which to transfer the money, why the money is being transferred, and so forth.

After this the set of tasks are ordered and chained. Ordering attempts to identify an appropriate sequence position of a particular quadruple or step in a task made up of multiple steps. This produces an ordering of steps for completing the task. Sometimes there are multiple ways to achieve the same task. These alternate ways may sometime share common steps. Some ways may contain extra steps. These may all be represented in a flow graph. Chaining links related tasks together to create procedural knowledge and perform higher-level tasks. For example, one task related to finding a rental car may be chained with the higher-level task of preparing for a trip. The trip preparation task may contain various sub-tasks, such as obtaining an airplane ticket, finding a rental car, finding a hotel, planning meals, planning activities at the destination, and so forth.

A user may repeatedly return to the system to continue working through steps related to a task. For example, a user may first query about traveling and receive agent information for planning a trip, then may begin performing individual steps related to that task. These steps may lead to later queries as the user moves to a new device, takes a break and does other things, or otherwise is interrupted during the process of the task. Upon returning, the user may begin by querying for information at the user's current step (e.g., "finding an airline ticket"). The system is able to infer the user's current position within a ranked sequence of steps within a task as well as within a chained sequence of tasks related to a larger goal. With this knowledge available, the system can help the user achieve the goal, provide relevant advertising information, and so on. Thus, the procedural inference system provides a generalized framework that helps users to complete tasks using already available data and does not ask each data provider to invest in infrastructure to build dedicated task information systems.

Often the system will not initially know what task a user is performing but will receive an indication of the user's present intent (e.g., through a search query submitted by the user. Understanding intent of a person in online services is useful to satisfy the needs of the user. Normally users are involved in tasks (e.g., 46% of MICROSOFT™ BING™ customers are engaged in sessions 30 minutes or longer). Today's search paradigm is very much a query-response paradigm. Although intent classifiers are also geared towards understanding intents of user on single queries, recent work related to the system described herein has tried to understand how single queries fit into a larger tasks. Currently most online search experience only allows query based search—the search engines only return results for the current query. However, if the search engine can understand which tasks the users are involved in, finding intent can become easier. The procedural inference system understands that a query is often part of a bigger task. A second problem is that there is often ambiguity about user intent. The same query may be part of a variety of tasks. The system solves this problem, in part, by ranking possible procedural matches.

Another problem is that only a small part of a user's actions appears online in search engines. Very often relevant actions (like opening 401k accounts or transferring money from one account to another) may happen over the phone or using other services. Even if an action happens online, it is not visible to search engines. Therefore, understanding user tasks involves coordination of human knowledge, not just online activities.

The procedural inference system addresses these and other problems through the creation of a procedural knowledge-base. This knowledge base includes 1) information about a multitude of tasks across a variety of domains, 2) information on steps in a task (including optional or repeated steps), 3) a clear idea of who is the agent performing the action, what is the object on which this action is performed, and what outcomes will be, and 4) an idea of intent associated with each step, and mapping of search queries that can map to this intent and vice versa. The system leverages the huge amount of already existing user-contributed knowledge that gives a more complete picture of tasks than online search and browsing alone.

This section briefly discusses how tasks can be modeled. One method is using aggregated knowledge from the world-wide web. There are many web sites where knowledge on how to accomplish tasks is aggregated by users. For example, in the finance domain, frequently asked question (FAQ) pages from various banks give answers to common questions. Sites like eHow.com explicitly provide answers to questions. For example, such sites include information about specific tasks like rolling over a 401k. There are other related tasks that are slightly different, such as rolling over a 401 k to a Roth IRA, or other tasks may be sub-tasks of the first task (e.g., how to avoid penalties with a 401k rollover. In general, a task will have multiple steps to it. The procedural inference system can scrape web pages and other data sources (e.g., application stores/markets, application aggregators, direct developer submissions, feeds, and so on) to create structured task stages from this kind of information.

For example, the 401k rollover task can be divided into five stages that can be automatically derived from existing available information. Each stage has an intent and actions (with conditions and constraints) associated with that stage. The first stage's intent is to determine whether rollover is appropriate. The actions might include checking whether the user has a guaranteed new job and verifying that rollover will not violate terms of the account with the old employer. The second stage's intent is to follow the correct procedure, and includes actions like filling out IRS form 1099-R to trigger a distribution of funds. The third stage's intent is opening a new account and includes the action of opening a new account within 60 days of filing form 1099-R. The fourth state's intent is again to follow correct procedure, and includes the action of completing Form 5498 to report successful deposit of funds in the new IRA. The fifth stage's intent is to find the right investing options, and may include actions like researching investing options to study mutual funds, talking to a broker, and allocating a distribution between investing options.

Note that as shown by this example, intents can be the same across different tasks. For example, the intent in stage three, opening an account, may be the same action in another task, such as saving for a child's college education. However, the actions associated with the intent may be different in different tasks. In addition, the intent may be the same at various stages of a single task. For example, the intent in stage two of the above example is the same as that of stage four. However, the action in each stage to carry out the intent is different.

The procedural inference system can go further than simply helping the user through the task by aggregating task information. For example, the system may also help the user find agents (e.g., applications, web pages, or others) that can help perform various actions. The stages derived by the system can be mapped to agents for performing that stage. In addition, the system can associate advertisements with particular stages. For example, a query for "1-864", an affidavit for support, may be associated with a task for performing 401k rollover and may lead to advertisements related to that task or stage.

FIG. 1 is a block diagram that illustrates components of the procedural inference system, in one embodiment. The system 100 includes a task knowledge base 110, a knowledge induction component 120, a query intent classifier 130, a task identification component 140, a task disambiguation component 150, a user dialog component 160, an agent classification component 170, and an advertisement mapping component 180. Each of these components is described in further detail herein.

The task knowledge base 110 is a data store that includes structured information describing one or more tasks that a user can perform. The data store may include one or more files, file systems, hard drives, memory units, databases, cloud-based storage services, or other facilities for storing data. Each task includes stages (or steps) that specify an intent or desired outcome for that stage, as well as actions that are part of successful completion of that stage. The knowledge base may describe tasks in the form of a quadruple that includes a subject, object, predicate, and context, or in any other form that provides sufficient structure for describing tasks in an actionable manner. The task knowledge base 110 includes a task ontology. At its core, an ontology is a method of placing structure around a concept, and may include structuring knowledge in a form that is actionable by automated processes, like computer programs. A task ontology provides a structured representation of tasks that can be stored and used to identify tasks and help complete them. The task knowledge base 110 may include information describing a multitude of tasks across a variety of domains. For each stage and action within a task, the knowledge base 110 includes a clear idea of who is the agent performing the action, what is the object on which the action is performed, and what outcome(s) will be expected. The knowledge base 110 may also include an indication of intent associated with each stage, and a mapping of search queries and advertisements that can map to this intent and vice versa.

The knowledge induction component 120 gathers data from one or more data sources, identifies procedural steps within the data, and stores structured task information in the task knowledge base 110. The data may include web pages (e.g., how-to or FAQ pages), documents, public and private data sources, and so forth. The knowledge induction component 120 can leverage a variety of well-known techniques such as natural language processing and machine learning to discover content from a particular data source and determine what the content is about. Once the content is discovered and it is identified as containing task-related information, the component 120 breaks the discovered information into one or more steps and captures information related to each step such as who performs the action, what action is performed, what object the action is performed on, any constraints or modifying conditions, and so forth. The system fits this information into the model of the task ontology and stores the information in a structured manner so that the information can be used to help users complete tasks that involve the discovered steps. The component 120 may also discover relationships between tasks in a similar manner. For example, web pages often contain a "next" link that describes steps a user might perform after completing steps on the current page. This can help the system to link and chain tasks together to learn information about accomplishing higher-level tasks.

In addition to knowledge discovered from data sources, the knowledge induction component 120 also infers new knowledge from existing knowledge. Knowing two discovered facts A and B, it is possible for the component 120 to infer new fact C. For example, knowing that a particular law exists in Washington State, that a person is a resident of Seattle, and that Seattle is a city in Washington State, the system 100 can infer that the person is subject to the law even though that fact is not explicitly provided by the available data sources. Inferred knowledge leads to even more help that the system 100 can provide to users by building the available knowledge base.

The query intent classifier 130 receives one or more search queries related to a task a user wants to perform and classifies each query into the task ontology to identify one or more task stages with matching intent. There are different ways to build these classifiers. Knowledge of the domain makes it easier to build a classifier compared to traditional document entity classifiers against a taxonomy. For example, in some embodiments the system 100 tags web pages with clear intent (e.g., web pages where users find information about college savings). Using a variety of algorithms, the system 100 can use this information to classify queries. For example, using a random walk algorithm on a bipartite graph of queries and URLs that have been clicked on, the classifier 130 can classify queries into appropriate categories. Sometimes queries can be directly classified to match tasks or task stages without going through intent.

The task identification component 140 maps the identified task stages to one or more tasks that the user may be attempting to perform based on matching intent. The task ontology creates relationships between discovered task stages and inferred tasks related to those stages. Thus, after the system 100 has matched the user's intent to one or more task stages, the system 100 can then determine which tasks are linked to those task stages. This may lead to the system 100 identifying a variety of tasks, as the user's intent may be ambiguous or may be consistent with multiple tasks. One goal of the task identification component 140 is to identify the universe of tasks the user may be trying to complete, which is expected to be smaller than the universe of all possible tasks. The task identification component 140 then provides this information to the task disambiguation component 150.

The task disambiguation component 150 associates a relative probability with each task identified by the task identification component, wherein the relative probability provides a measure of how likely the task associated with the probability is the one the user is currently trying to perform. The component 150 may use a variety of techniques, such as creating a Bayesian network among possible tasks and search queries that assigns a probability to any particular point in the model. The component 150 uses the relative probability to rank identified tasks and may then choose the most likely task from the universe of possibilities. In some embodiments, the component 150 may invoke other components, such as the user dialog component 160 to enlist the user's help or other sources of help in resolving any ambiguity.

The user dialog component 160 prompts the user for additional information related to the user's intent to help the task disambiguation component 150 identify which task the user is trying to perform. For example; if a user queries "transfer money between accounts", the system 100 may provide follow up questions asking whether the user is transferring to his own accounts, to someone else's accounts, whether the accounts are 401k/checking/other types, and so on. The system 100 uses the task possibilities identified by the task identification component 140 to generate appropriate prompts to the user for selecting between the identified possibilities. Upon receiving a response from the user, the system 100 can select a particular task as the one the user is trying to perform, and can provide appropriate task guidance based on information about related actions in the task ontology.

The agent classification component 170 discovers and classifies one or more agents for performing stages of tasks stored in the task knowledge base 110. Agents may include web applications, mobile applications, desktop software applications, phone-based customer service, or any other resource for accomplishing some portion of a task. For example, if the task is transferring money between a user's checking and savings accounts at Bank of America, the component 170 may have previously stored information about an online website, a mobile application, and a customer service phone number for transferring funds. The component 170 classifies these agents by associating them with task stages in the task knowledge base 110. Then, when a particular user's query matches to such a task stage, the system 100 suggests one or more appropriate agents for completing that stage. In some cases, a user may have a choice of multiple agents that are each capable of helping the user complete that stage. In some embodiments, the component 170 also gathers information describing input and output data of agents to build an application fabric that allows the system to provide communication between agents that perform various stages of a task. The system 100 may store information describing how the output of an agent that helps at one stage can be provided as the input to another agent that helps at a subsequent stage.

The advertisement mapping component 180 maps advertisements submitted by one or more vendors to task stages, actions, or other entities in the task knowledge base 110. This allows vendors to associate themselves with appropriate task stages or actions for the purpose of offering themselves as an agent for completing that stage, selling related services, or making the user aware of competing products. The system 100 can then provide consumers with relevant advertisements at any stage of a task the user is trying to complete. In addition to allowing advertisers to select task categories from the ontology, the component 180 can also infer and suggest which categories may be suitable for a particular advertisement. Conversely, when showing advertisements, the system 100 can infer which advertisements may be suitable for a particular part of the task ontology being shown. Because of the additional knowledge the system 100 has about the task at hand, the system 100 can offer much more relevant advertisements than those produced by traditional keyword matching methods.

The computing device on which the procedural inference system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
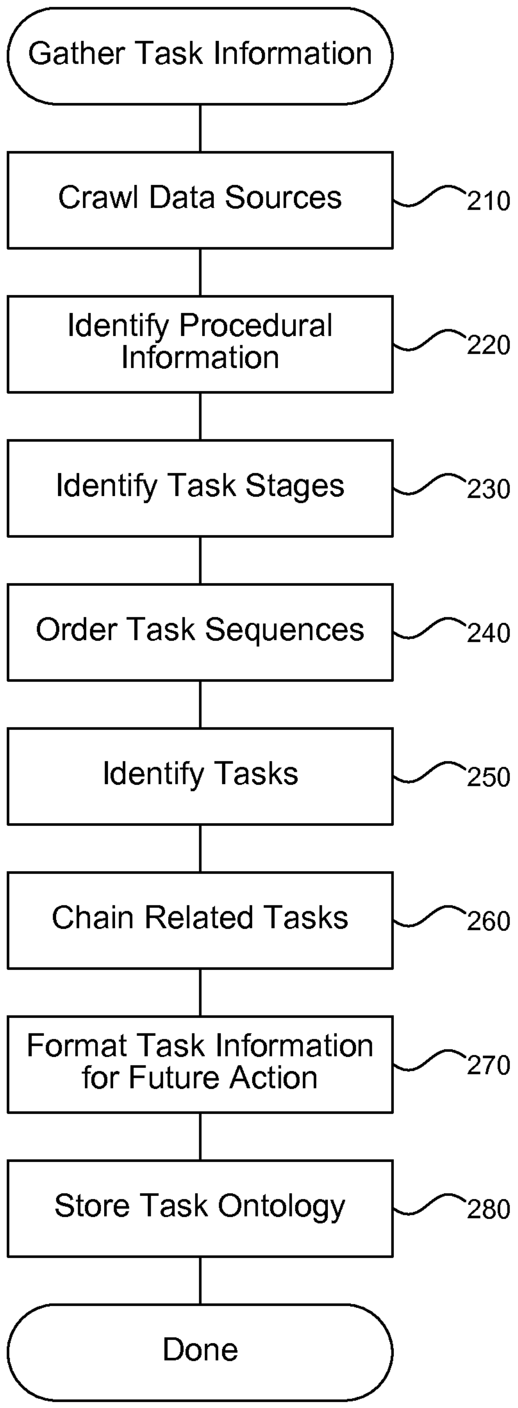
FIG. 2 is a flow diagram that illustrates processing of the procedural inference system to gather task information from data sources to build and maintain a task ontology, in one embodiment.

FIG. 2 is a flow diagram that illustrates processing of the procedural inference system to gather task information from data sources to build and maintain a task ontology, in one embodiment. Beginning in block 210, the system crawls one or more data sources, such as those available via the web. The system may receive information identifying particular data sources to crawl that are known to contain procedural information (e.g., VVikipedia, eHow, and others) or may crawl a number of potential data sources identified in a search engine index or other location. The crawling may include retrieving web pages, documents, or other information sources.

Continuing in block 220, the system identifies procedural information within the data sources. The system may include one or more filters that identify procedural information for specific sites. For example, a filter for eHow may include information that each how-to page includes a title that identifies a task, an "Instructions" section that precedes a set of steps, and steps numbered with a numeric heading. For other data sources for which no filter is available, the system may identify action words using natural language processing, identify ordered headings, or use any other method that is effective to identify procedural information.

Continuing in block 230, the system identifies task stages within the identified procedural information. The procedural information may include many task stages, or steps, and the system splits these into smaller units of a single task stage. Each task stage may include an intent and one or more actions, and the system identifies these from the procedural information. The system associates the identified task stages with one or more tasks to which the stages are related through textual clues or other information (e.g., page titles, topic headings, pages that link to the procedural information, and so forth).

Continuing in block 240, the system orders the identified task stages to determine one or more potential task sequences. Task stages may be found in a variety of data sources and the order in which the stages are to be completed may not be obvious from the context in which the procedural information is found. In other cases, the procedural information itself may suggest an ordering for task stages (e.g., by providing numbered headings or other clues about the order of stages). The system uses the available information to order possible sequences to create task information. In some embodiments, ordering task stages results in constructing a flow graph that identifies various ways the task can be accomplished. These graphs can be expressed using mathematical models, which are graphical models, Markov processes, or related mathematical structures.

Continuing in block 250, the system identifies tasks from the task sequences produced by the ordering. A task can include various stages and may include sub-tasks. Tasks may for a task hierarchy in which higher-level tasks have numerous subtasks that make up one or more stages. Tasks at the leaf nodes include steps that can be completed by the user, agents, or other entities. A task can be any set of steps that accomplishes a goal in some domain, such as "creating a will", "tying your shoes", or any other topic for which information can be discovered.

Continuing in block 260, the system chains related tasks together based on the identified task stages and sequences to create a graph of related tasks. Tasks may include many sub-tasks and may also be sub-tasks of multiple other tasks. For example, the task "eat breakfast" could be a sub-task of the task "prepare for a swim meet", "get ready for school", or any number of other tasks. Chaining records knowledge that describes how various tasks are related which is used to help the user continue with the user's goals after the present task's steps are complete.

Continuing in block 270, the system formats the task information produced by the previous steps into a structured task ontology that includes actionable task information. For example, the system may use the quadruple format described herein in which each task action includes a subject, object, predicate, and context. The system may also identify one or more agents that describe or are capable of carrying out a particular action. The task ontology provides a structured representation of the concepts discovered from the data, and the structure permits the information to be used by automated processes to help users complete tasks.

Continuing in block 280, the system stores the structured task ontology in preparation for receiving one or more queries to complete tasks. The system may store the ontology in a database, cloud-based storage service, or other storage facility from which the information can be accessed at query time. In some cases, the system may distribute the task ontology information to a variety of search engine servers for applying the ontology to incoming queries in a scalable fashion. After block 280, these steps conclude.

Figure 3:
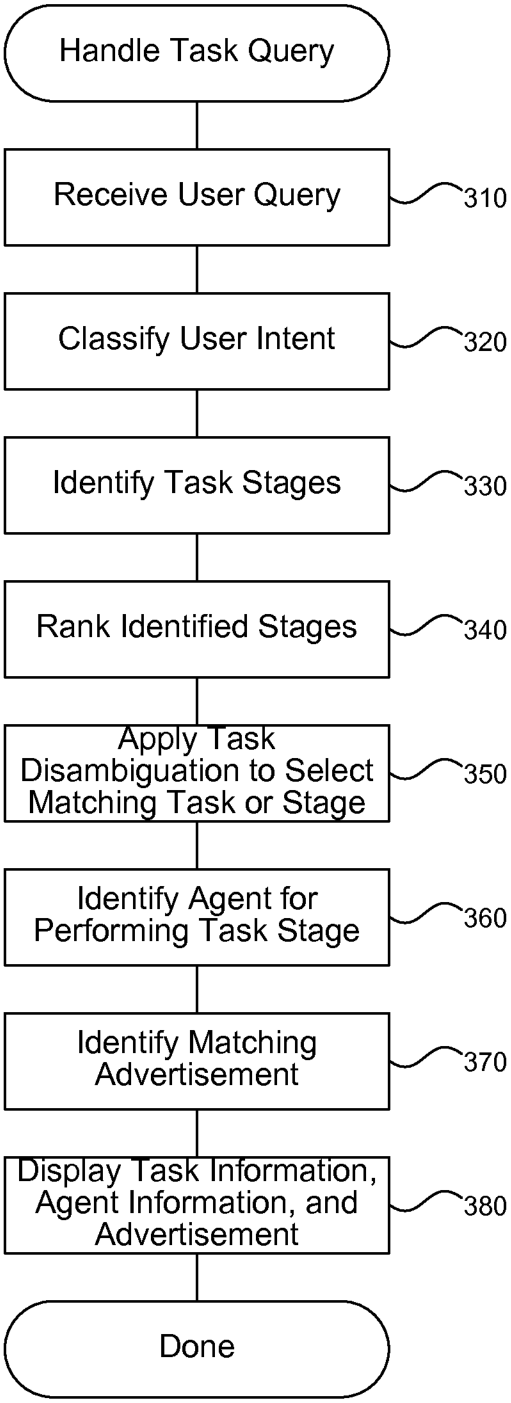
FIG. 3 is a flow diagram that illustrates processing of the procedural inference system to handle a task-related query using information stored in a task ontology, in one embodiment.

FIG. 3 is a flow diagram that illustrates processing of the procedural inference system to handle a task-related query using information stored in a task ontology, in one embodiment. Beginning in block 310, the system receives a user query. The user may submit the query to a search engine, a dedicated web site for receiving task requests, a third party website that leverages the procedural inference system to help customers, and so forth. The query may include text information describing a task that the user is trying to complete or simply keywords related to what the user is trying to do. In some cases, the system may allow a user to directly browse the task ontology and select the task stage that the user is currently interested in completing. This can short-circuit the following steps, making user intent clear and less ambiguous. This provides a tradeoff to users between ease of use and accuracy of task selection.

Continuing in block 320, the system optionally classifies the user's intent based on the received query to determine one or more tasks the user is trying to perform. The user may be just stating a task or at any point within a task, so the system may identify what stage the user is at as well as the user's overall goal. The system accesses a task ontology that associates possible intents with one or more task stages, and matches the user's intent to the possible intents. In some cases, the user's intent may be ambiguous and the system may identify multiple possible user intents.

Continuing in block 330, the system identifies one or more task stages in a task ontology that match the classified user intent. In some cases, the system may not determine the user's intent so long as a task or task stage can be identified based on the available information or circumstances. A task stage includes a portion of a larger task and may include an intent associated with the stage as well as one or more actions for successfully completing the stage. The system identifies task stages that match the user's intent by comparing the classified user intent with the intent associated with each task stage. Multiple matches may be found due to either ambiguity in the user's intent or multiple matching stages that have the same intent.

Continuing in block 340, the system ranks identified task stages to produce a list ordered by relevance of each identified task stage to the classified user intent. The ranking may be based on textual analysis that leads to a degree of certainty, Bayesian or other probabilistic analysis, historical information related to past queries, and so forth.

Continuing in block 350, the system applies task disambiguation to select at least one task or task stage that is a good match for the classified user intent. The system may ask the user questions or receive other additional information to help disambiguate what the user is trying to do. The system may present the user with one or more possible tasks that the system determines the user is trying to complete, so that the user can select the closest matching one. In some cases, the system automatically selects one or more of the ranked task stages to present to the user.

Continuing in block 360, the system identifies one or more agents for performing one or more actions associated with the selected task stage. The agent may include a website, online tool, mobile application, desktop application, traditional customer service option, or other entity or service that can help the user with a particular action related to a task stage. The system may identify agents based on prior registrations of agents, past user satisfaction with a particular agent, money paid by the agent for being recommended, or any other basis.

Continuing in block 370, the system identifies one or more advertisements that are related to the selected task stage. Advertisements are only one possible application of the system. Applications can be sponsored, but the system can also provide other supplemental information related to the task ontology and steps in progress at any given stage. In some cases, the system provides an administrative user interface through which advertisers register advertisements and select appropriate stages within the task ontology to which to associate the advertisements. The system may use a bidding model to select between competing advertisements for the same stage, or may provide other mechanisms for selecting advertisements (e.g., round robin, subscription plans, and so on).

Continuing in block 380, the system displays information associated with the selected task stage to help the user complete the task. The system may also display any identified agent and advertisement related to the selected task stage. The system may display the information on a website, through a software application, or using another facility for providing information to the user. The system may walk the user through additional steps after the selected task stage is complete. After block 380, these steps conclude.

Figure 4:
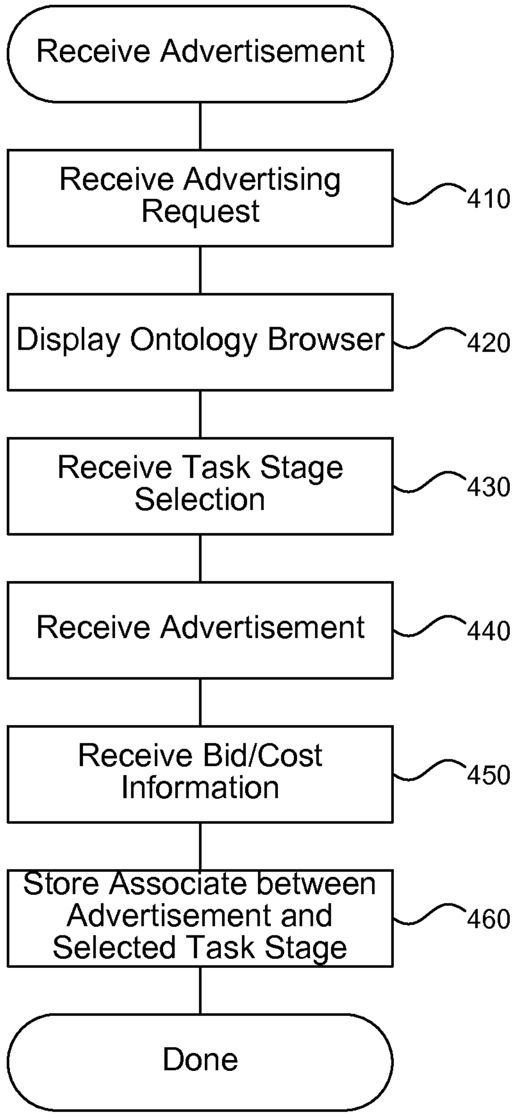
FIG. 4 is a flow diagram that illustrates processing of the procedural inference system to receive advertisements through an administrative user interface provided to advertisers, in one embodiment.

FIG. 4 is a flow diagram that illustrates processing of the procedural inference system to receive advertisements through an administrative user interface provided to advertisers, in one embodiment. Beginning in block 410, the system receives a request to view the administrative user interface for advertisers. The system may provide a website, application, or other point of access through which advertisers can access the interface to create advertisements, associate the advertisements with entities in a task ontology, and provide bid/cost information that defines the terms under which the advertiser will pay for the advertisement.

Continuing in block 420, the system displays an ontology browser in response to the request that allows the advertiser to display task stages in a task ontology with which the advertiser can associate one or more advertisements. The advertiser may provide an agent or other services related to the task stage that users completing that stage would be interested in knowing about through the advertisement. The ontology browser may provide a variety of interfaces into the task ontology, such as search, tree view, or other ways of navigating the various tasks and task stages so that the advertiser can find one or more stages related to the advertisement.

Continuing in block 430, the system receives a selection from the advertiser of one or more task stages with which to associate an advertisement. The system may allow the advertiser to select multiple task stages per advertisement or to create multiple advertisements each associated with a set of task stages. The advertiser may provide the selection through a web interface or other interface for receiving data from the advertiser. In some embodiments, the system maintains a stored user profile for the advertiser that includes information about past advertising campaigns, task stages selected, performance information, and so forth.

Continuing in block 440, the system receives one or more advertisements from the advertiser to associate with the selected task stage. The advertisement may include text, images, video, applications, or any other content supported by the system. In some cases, advertisers provide agents to help users complete tasks that are applications (e.g., web or mobile) capable of automating various stages of the task at hand.

Continuing in block 450, the system receives cost information that describes how the advertiser will pay for the advertisement. In some cases, the system provides an auction-style advertising service in which advertisers bid for association with particular task stages. The cost may be calculated per display, for some exclusive time period with a task stage, or on any other basis agreeable to advertisers and an operator of the system.

Continuing in block 460, the system stores an association between the received advertisement and the selected task stage. The system includes a data store of advertisements that manages associations between the advertisements and task stages, and provides advertisements for display to users as various task stages are displayed to the users. After block 460, these steps conclude.

In some embodiments, the procedural inference system stores site-specific knowledge for gathering task information from particular data sources. Many data sources have a format that is consistent and that makes extraction of task information easier. The system may auto-detect such formatting or leverage manual intervention to specify the format. The system can load known formats at the crawl phase to more efficiently crawl known data sources and to more accurately interpret found information in the context of tasks. This information is then placed appropriately into the task ontology and stored for later use to help users complete tasks.

In some embodiments, the procedural inference system a user visits the system repeatedly over a long period of time. The system may store information to recognize the user and to record a task or tasks that the user is in the process of performing. This can help the system to provide more effective assistant related to the user's current intent. For example, if the system knows the user is in the process of buying a house, and selected a house in the last session with the system, then the system may now provide lender or other closing information to help the user complete the next task stage.

In some embodiments, the procedural inference system combines ontology information gathered automatically with manually entered ontology information. In some cases, the system may receive task information from domain experts that provide information about tasks, actions for completing tasks, agents for helping with tasks, and so forth. The system may provide an interface through which users can contribute to the task ontology managed by the system. The system may also provide voting, reputation, or other facilities for judging the quality of user submissions to protect the integrity of the task ontology.

In some embodiments, the procedural inference system integrates information from social networks. For example, agents suggested to a particular user may come from that user's social network. The system may recommend lenders, bankers, or other service providers that the user already knows or has worked with in the past. This increases the users comfort with the agent and allows the system to provide a more personalized recommendation. The system may also use other information about the user. For example, knowledge of a brand of mobile device that the user owns can allow the system to recommend mobile applications compatible with that device. The system may know this information because it is provided by the device the user accesses the system with, by direct inquiry to the user, through stored profile information, or from third party sources. The system may also enlist friends to help users with tasks.

In some embodiments, the procedural inference system provides its own platform for building agent applications that can help users to perform tasks. These applications may fit more naturally into the application fabric discussed herein that allows applications from one stage to communicate with those from another and to pass data from stage to stage in the course of completing a task. The platform may provide uniform interfaces, entry points, data models, and so forth for facilitating inter-application communication. The fabric may also allow for applications written for different platforms (e.g., iOS and Android) to work together to complete a task as well as across devices (e.g., start task on phone, continue on tablet, and finish on personal computer).

In some embodiments, the procedural inference system provides a reporting infrastructure for deriving various information from use of the system. The reporting system can be used to provide advertisers with information about the interest in their advertisements, use of particular agents, and so forth. The system may collect and provide various anonymous demographic, usage, or other statistical information about users using the system to complete tasks. The information is managed in a way to protect user privacy while providing useful information for future decision-making.

In some embodiments, the procedural inference system infers procedural knowledge from social networking data. For example, blogs, wikis, Facebook, MySpace, LinkedIn, and others may all contain knowledge related to completing tasks. Recent changes to Facebook and other social networks make available semi-structured knowledge about some process or procedure. For example, using Facebook, one can buy a book, read a book, and review a book. These are called Facebook verbs. Over time, the available verbs will grow.

From the foregoing, it will be appreciated that specific embodiments of the procedural inference system have been described herein for purposes of illustration, but that various modifications may be made without deviating from the spirit and scope of the invention. Accordingly, the invention is not limited except as by the appended claims.

We claim:

1. A computer-implemented method to gather task information from data sources to build and maintain a procedural knowledge base, the method comprising:

crawling one or more data sources;

identifying with a knowledge induction component operating on a computer system, procedural information within the data sources;

identifying task stages within the identified procedural information, wherein a task stage is a portion of a task;

ordering the identified task stages to determine one or more potential task sequences;

identifying tasks from the task sequences produced by the ordering;

formatting task information produced by the previous steps into a structured task knowledge base that includes actionable task information; and storing the structured task knowledge base in preparation for receiving one or more queries to complete tasks, wherein the preceding steps are performed by at least one processor, and a knowledge induction component that gathers data from one or more data sources, identifies procedural steps within the data, infers new knowledge from existing knowledge when at least two discovered facts infer at least one new fact ire the existing knowledge, and stores structured task information in the task knowledge base.

2. The method of claim 1 further comprising adding additional knowledge describing which advertisement to show for which tasks to the task knowledge base.

3. The method of claim 1 wherein crawling comprises first receiving information identifying particular data sources to crawl that are known to contain procedural information.

4. The method of claim 1 wherein identifying procedural information comprises applying automated processes using one or more natural language processing or machine learning methods.

5. The method of claim 1 wherein identifying procedural information comprises inferring new knowledge from previously discovered information.

6. The method of claim 1 wherein identifying task stages comprises identifying an intent and one or more actions related to the task stage.

7. The method of claim 1 wherein ordering task stages comprises applying a score to each task stage that indicates a potential correct sequence for that task stage.

8. The method of claim 1 wherein ordering task stages comprises extracting ordering information from the identified procedural information and constructing a flow graph that identifies various ways the task can be accomplished.

9. The method of claim 1 wherein identifying tasks comprises identifying stages associated with the tasks and any related sub-tasks.

10. The method of claim 1 further comprising, after identifying tasks, chaining related tasks together based on the identified task stages and sequences to create a graph of related tasks.

11. The method of claim 1 wherein formatting task information comprises identifying n-tuples in which each task action includes at least one of a subject, object, predicate, and context.

12. The method of claim 1 wherein formatting task information comprises identifying one or more agents that describe or are capable of carrying out a particular action.

13. A computer system for inferring procedural knowledge from data to help users complete tasks, the system comprising:

a processor and memory configured to execute software instructions embodied within the following components;

a task knowledge base that stores structured information describing one or more tasks that a user can perform;

a knowledge induction component that gathers data from one or more data sources, identifies procedural steps within the data, infers new knowledge from existing knowledge when at least two discovered facts infer at least one new fact in the existing knowledge, and stores structured task information in the task knowledge base;

a query intent classifier that receives one or more search queries related to a task a user wants to perform and classifies each query into a task knowledge base to identify one or more tasks with matching intent;

a task disambiguation component that determines whether multiple tasks match the classified user intent and helps the user select at least one task to receive information related to the task the user is currently trying to perform; and an agent classification component that discovers and classifies one or more agents for performing stages of tasks stored in the task knowledge base.

14. The system of claim 13 wherein the task knowledge base comprises a task ontology and stores for each task multiple task stages, each stage identifying a corresponding user intent and one or more actions for completing that stage.

15. The system of claim 13 wherein one or more of tasks or task stages are associated with one or more actions and one or more agents for completing that stage.

16. The system of claim 13 further comprising a task identification component that maps the identified task to one or more task stages that the user may be attempting to perform based on matching intent.

17. The system of claim 13 further comprising a user dialog component that prompts the user for additional information related to the user's intent to help the task disambiguation component identify which task the user is trying to perform.

18. The system of claim 13 further comprising an advertisement mapping component that maps advertisements submitted by one or more vendors to task stages, actions, or other entities in the task knowledge base.

19. The system of claim 13 further comprising an application fabric component that describes input and output data of agents to allow the system to seamlessly provide communication between agents that perform various stages of a task.

20. A computer-readable storage device comprising instructions for controlling a computer system to handle a task-related query using information stored in a task knowledge base, wherein the instructions, upon execution, cause a processor to perform actions comprising:

receiving a user query;

classifying the user's intent based on the received query to determine one or more tasks the user is trying to perform, identifying a current stage for the user within the one or more tasks, and accessing a task ontology that associates possible user intents with one or more task stages;

identifying one or more task stages in a task knowledge base that match the query, wherein the one or more task stages comprise a portion of a larger task, an intent associated with the one or more task stages, and one or more actions associated with completing the task stage, wherein the task knowledge base is augmented by a knowledge induction component that gathers data from one or more data sources, identifies procedural steps within the data, infers new knowledge from existing knowledge when at least two discovered facts infer at least one new fact in the existing knowledge, and stores structured task information in the task knowledge base;

applying task disambiguation to select at least one task or task stage that is a good match for the classified user intent;

identifying one or more agents for performing one or more actions associated with the selected task stage; and displaying information associated with the selected task stage to help the user complete the task, wherein the information includes an identified agent related to the selected task stage.

* * * * *